(12) United States Patent
Silverstein

(10) Patent No.: US 7,310,439 B2
(45) Date of Patent: Dec. 18, 2007

(54) ROBOT HAVING AN IMAGING CAPABILITY

(75) Inventor: D. Amnon Silverstein, Mountain View, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 658 days.

(21) Appl. No.: 10/206,330

(22) Filed: Jul. 29, 2002

(65) Prior Publication Data

US 2004/0017937 A1    Jan. 29, 2004

(51) Int. Cl.
G06K 9/00 (2006.01)
G06F 19/00 (2006.01)

(52) U.S. Cl. ......................... 382/153; 700/245
(58) Field of Classification Search ................ 382/153
See application file for complete search history.

(56) References Cited

U.S. PATENT DOCUMENTS

| | | | |
|---|---|---|---|
| 4,539,703 A | | 9/1985 | Clearman et al. |
| 4,597,006 A | * | 6/1986 | Orsburn ..................... 348/586 |
| 4,613,269 A | * | 9/1986 | Wilder et al. ............... 700/259 |
| 4,613,942 A | | 9/1986 | Chen |
| 4,727,471 A | | 2/1988 | Drieils et al. |
| 4,799,267 A | * | 1/1989 | Kamejima et al. .......... 382/153 |
| 4,855,822 A | * | 8/1989 | Narendra et al. ........... 348/114 |
| 4,942,538 A | | 7/1990 | Yuan et al. |
| 4,998,209 A | * | 3/1991 | Vuichard et al. ........... 382/274 |
| 5,040,116 A | * | 8/1991 | Evans et al. ................. 701/28 |
| 5,179,441 A | | 1/1993 | Anderson et al. |
| 5,255,096 A | | 10/1993 | Boyle |
| 5,323,470 A | * | 6/1994 | Kara et al. .................. 382/103 |
| 5,341,459 A | | 8/1994 | Backes |
| 5,570,992 A | | 11/1996 | Lemelson |
| 5,579,444 A | * | 11/1996 | Dalziel et al. .............. 700/259 |
| 5,602,968 A | * | 2/1997 | Volpe ......................... 700/262 |
| 5,608,464 A | * | 3/1997 | Woodham .................. 348/578 |
| 5,668,738 A | * | 9/1997 | Ataras, III .................. 370/235 |
| 5,673,082 A | * | 9/1997 | Wells et al. ................ 348/139 |
| 5,802,201 A | | 9/1998 | Nayar et al. |
| 5,963,710 A | * | 10/1999 | Masumoto .................. 700/259 |
| 6,801,665 B1 | * | 10/2004 | Atsumi et al. .............. 382/239 |
| 2002/0089520 A1 | * | 7/2002 | Baar et al. .................. 345/645 |
| 2002/0135587 A1 | * | 9/2002 | Cunniff ...................... 345/545 |

OTHER PUBLICATIONS

Hongqing Liu et al., Introduction of Cache Memory, CMSC411 Project: Cache, Matrix Multiplication, and Vector . . . , Summer 2001, 14 pages.

(Continued)

Primary Examiner—Andrew W. Johns
Assistant Examiner—Damon Conover

(57) ABSTRACT

A robot having an imaging capability includes: an imaging device, and at least one actuator separate from the imaging device for moving at least a portion of the robot. The at least one actuator is controllable in response to a control command, the imaging device being responsive to the control command to modify characteristics of image data produced.

20 Claims, 6 Drawing Sheets

OTHER PUBLICATIONS

Alan Jay Smith et al., A Comparative Study Of Set Associative Memory Mapping Algorithms And Their use For Cache And Main Memory., IEEE Transactions of Software Engineering., vol. SE-4, No. 2, Mar. 1978, pp. 121-122; 129-130.

K. Maruyama., mLRU Page Replacement Algorithm In Terms Of The Reference Matrix., IBM Technical Disclosure Bulletin., vol. 17, No. 10, Mar. 1975, pp. 3101-3103.

K. Maruyama., Implementation Of The Stack Operation Circuit For LRU Algorithm, IBM Technical Disclosure Bulletin, vol. 19, No. 1, Jun. 1976, pp. 321-325.

Alan Jay Smith, Cache Memories, Computing Surveys., vol. 14, No. 3, Sep. 1982, pp. 473-530.

\* cited by examiner

ROBOT HAVING AN IMAGING CAPABILITY

BACKGROUND OF THE INVENTION

1. Field of the Invention

The present invention relates generally to robots with imaging devices.

2. Background Information

Imaging devices are used to produce image data for feedback control of robots. With the exception of activating or deactivating the imaging device, settings of the imaging device, such as magnification, resolution and so forth, are established in advance, or are modified by an operator overseeing operation of the robot. In some cases, the image data acquired using the established settings are sent to an operator display for this purpose. The operator can adjust commands to the robot in reaction to the display to modify control of the robot. In other cases, the image data is used by a processor, at the robot or remote from the robot, to provide commands to the robot. In some cases, the operator can adjust settings of the imaging device to modify the received image data. The image data acquired are a function of established settings, or settings which have been modified by the operator or the processor.

When the image data acquired by the imaging device are to be transmitted to the operator at a remote location, the amount of image data which can be transmitted may be limited due to bandwidth restrictions. In other cases, the amount of image data may be restricted to reduce the required image data processing time. The characteristics of the image data are typically set in advance or set by the operator, making tradeoffs among desirable image data characteristics to keep the amount of image data restricted. If the amount of image data is kept constant, an increase in one image data characteristic (such as resolution, frame rate or image quality) involves a reduction of another image data characteristic. The tradeoff among the image data characteristics can be used to provide desired feedback control for the intended tasks of the robot. In some cases, however, the selected image data characteristics reduce the versatility of the robot.

SUMMARY OF THE PRESENT INVENTION

Exemplary embodiments of the present invention are directed to a robot having an imaging capability, and a method of operation of such a robot. The robot includes an imaging device; and at least one actuator separate from the imaging device for moving at least a portion of the robot, the at least one actuator being controllable in response to a control command, the imaging device being responsive to the control command to modify characteristics of the image data.

Alternate embodiments are directed to a robot having an imaging capability which includes an imaging means for producing image data; and actuator means for moving at least a portion of the robot, the actuator means being controllable in response to an actuator control command, the imaging means being responsive to the actuator control command to automatically modify the imaging means for altering characteristics of the image data.

The present invention is also directed to a method for controlling a robot having an imaging capability, comprising: receiving image data from an imaging device located on the robot; and moving at least a portion of the robot in response to an actuator control command, the imaging device being responsive to the actuator control command to automatically modify characteristics of the image data.

BRIEF DESCRIPTION OF THE DRAWINGS

Other objects and advantages of the present invention will become more apparent to those skilled in the art upon reading the detailed description of the preferred embodiments, wherein like elements have been designated by like numerals, and wherein.

DESCRIPTION OF THE EXEMPLARY EMBODIMENTS

Figure 1:
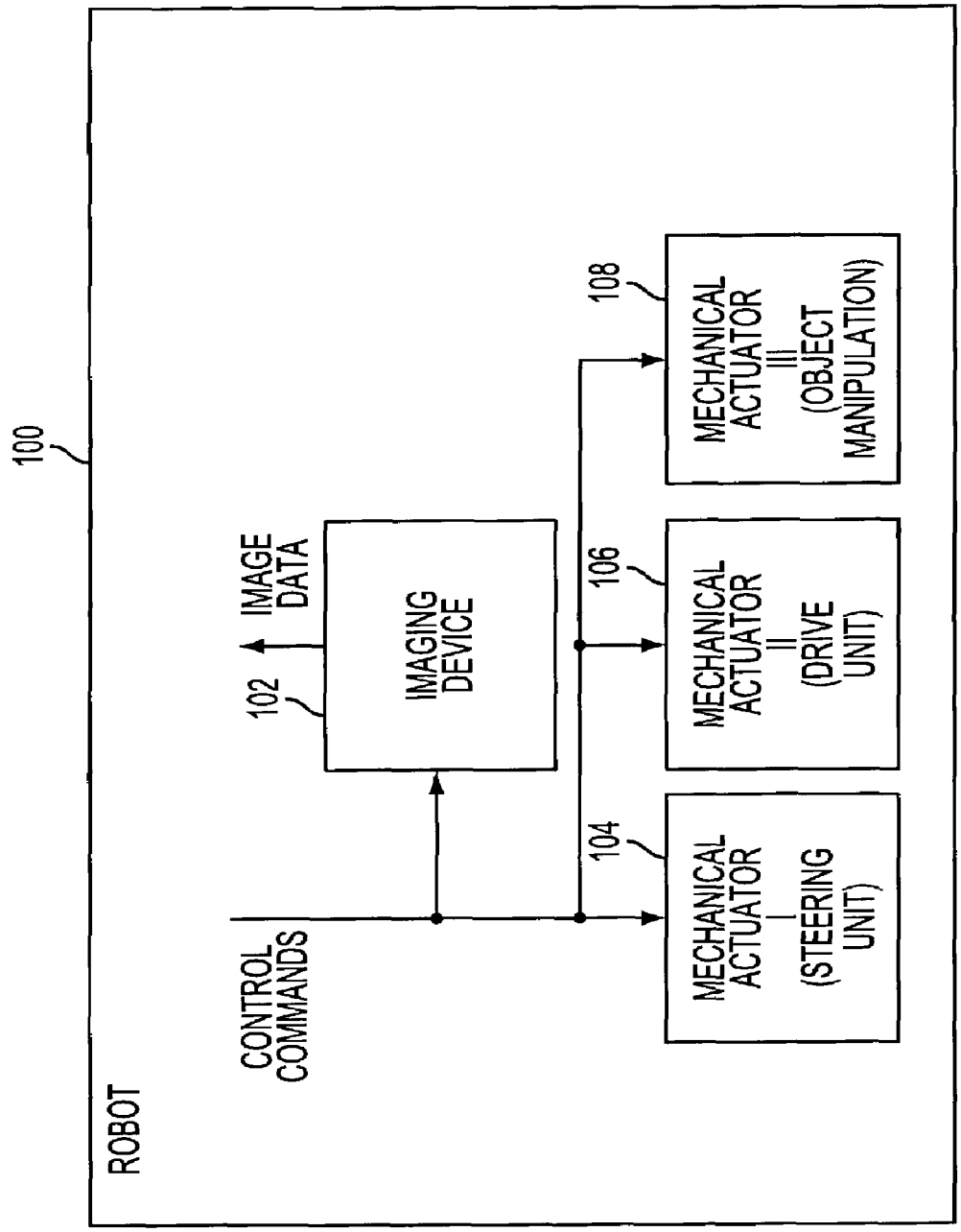
FIG. 1 is a block diagram illustrating a robot according to an exemplary embodiment of the present invention.

Exemplary embodiments of the present invention are directed to a robot having an imaging capability. FIG. 1 illustrates an exemplary robot 100 of the present invention. The robot 100 includes an imaging means, such as an imaging device 102, for producing image data. In an exemplary embodiment, the imaging device 102 includes any available camera or any image sensor (for example, any analog or digital sensing device including, but not limited to charge coupled devices (CCD) imaging arrays). The imaging device can also include an image processing unit, configured using any available processor or computing device suitable for the desired processing, to process raw image data produced by the camera or other image sensor.

In an exemplary embodiment, control commands can be directed via a signal path (e.g., wired line or bus, or wireless path) to at least one actuator means, such as actuator 104, 106 or 108, for moving at least a portion of the robot. Command processing can be used to automatically produce (e.g., translate) instructions to the imaging device and at least one actuator in response to (e.g., as a function of) the control command. The control command can be a variable, decision branch, or other indication in a software program. For example, a given actuator control command can be translated into an appropriate imaging device control signal, upon occurrence of a specified set of conditions, using a translation table stored in a look-up table associated with the imaging device.

In accordance with exemplary embodiments of the present invention, the actuators can include, for example, a drive unit, a steering unit, or any other electrical and/or mechanical actuator.

The imaging device 102 can be responsive to the control command to modify characteristics of the image data. For example, the frame rate of the image data can be automatically modified in response to (e.g., upon receipt by the robot of) an actuator control command used to effect some motion of the robot. In an exemplary embodiment, the resolution of the image data can be modified in response to the control command. Alternately, or in addition, the image quality of the image data can be modified in response to the control command.

Image data characteristics can include resolution, frame rate, image quality, luminance gain control or any other characteristics of image data. The image data characteristics do not include the on/off state of the imaging device itself.

Modifications to the characteristics of the image data can affect the whole image or a portion of the image. In an exemplary embodiment, the portion of the image affected can be associated with a region of interest.

A processor associated with the imaging device can be operably connected to a wireless communication device to perform image processing and/or to transmit the image data. The wireless communication device can also receive the control command. The control command can, for example, be provided to the processor to produce instructions to control actuators and to thereby modify one or more characteristics of the image data in the image processing unit of the imaging device.

FIG. 1 illustrates an exemplary embodiment in which the robot 100 has a number of actuators to implement a movement of the robot. In the exemplary embodiment of FIG. 1, actuator 104 is a steering unit for the robot; actuator 106 is a drive unit for the robot; and actuator 108 implements an object manipulation. The actuator 108 in one example is a grasping arm of the robot 100. The actuator can be a mechanical actuator, and the actuator can enable movement of the entire robot, or any portion thereof. In the exemplary embodiment of FIG. 1, actuator 104 enables movement of the entire robot. The actuators 104, 106, and 108 can be controllable in response to control commands, and the imaging device 102 can be responsive to at least one of the control commands to modify characteristics of the image data.

In an exemplary embodiment, an actuator can be a light switch and the image data characteristics are modified by adjusting the luminance gain control. The system can adjust the luminance gain control for the new lighting conditions at the time of the modification of the light switch without requiring a slow adaptation to the new lighting conditions.

The frame rate of the image data can be increased when the robot moves. When the robot is commanded to move, a higher image data frame rate may be desired, because it can be difficult to control a swiftly moving robot using image data with a significant time lag between image frames. Thus, when the robot is issued a control command to move, in an exemplary embodiment, the frame rate of the image data can be increased.

Referring to FIG. 1, a control command to the actuator 106 to increase the speed of the robot can cause the imaging device 102 to increase the frame rate of all or a portion of the image data. This allows, for example, the image data to be quickly updated while the robot moves. In an exemplary embodiment, the resolution of the image data can also be decreased when the robot moves. Decreasing the resolution can, for example, keep the amount of image data below a bandwidth restriction requirement. In an alternate exemplary embodiment, image compression can be used to maintain resolution when the robot is commanded to move.

When the robot is not moving, a high frame rate may not be desired for feedback. The resolution can be kept high and the frame rate kept low when no commands to move the robot have been issued.

In some instances, a region of interest can be indirectly determined from a control command issued to an actuator. For example, if the robot has an actuator to manipulate an object, when the operator instructs the actuator to open, it can be assumed that the manipulator is in a region of interest. In an exemplary embodiment, the image data associated with the region of interest can be varied (for example, improved in resolution by increasing the amount of data acquired from that region) in response to the control command. An increase in resolution can allow the region of interest to be better represented in the image data.

In the FIG. 1 example, a control command to operate the actuator 108 can cause the imaging device 102 to vary (for example, improve resolution) the image data related to the region of interest about the actuator 108 by, for example, transmitting more data and/or transmitting data with higher fidelity. For example, if the robot is instructed to move left, regions to the left of the robot can be assumed to be a region of interest. A control command to change the steering of the actuator 104 can cause the imaging device 102 to vary (for example, increase) the resolution of the image data in a region into which the robot is steering. The increase in resolution can allow the region of interest to be better represented in the image data.

In an exemplary embodiment, the image quality of the region of interest can also be increased. For example, if an object in a vicinity of the robot is silhouetted by the sun, a control command to move the object or to hold the object (for example, a command which instructs an actuator to move to a given target location in a field of view of the imaging device) can cause the imaging device to emphasize the object, even at the detriment to other portions of the image. Alternately, or in addition, image data associated with a region away from the object can be reduced in response to the control command. In this way a total amount of image data can be kept limited.

Image data for regions of interest can be transmitted with a higher or lesser resolution, or higher or lesser compression than other areas. Alternately, or in addition, regions of interest can be transmitted at a higher frame rate than the surrounding image. For example, a region of interest in the image data can use the full frame rate and regions of less interest can be transmitted by averaging pairs of video frames to reduce the amount of the transmitted data. In an alternate embodiment, pairs of video frames can be blended in any desired manner to more closely correspond to a motion blur. Images can be pre-blurred, or blended along a trajectory that is determined by, for example, recovering the camera motion. At the receiver, frames for less interesting regions can be up sampled and combined with frames for regions of interest acquired at a higher frame rate.

In an exemplary embodiment, data compression processing can be modified in response to the control command. One example of data compression processing is the Moving Picture Experts Group (MPEG) encoding. In an exemplary embodiment, the MPEG encoding can be used to finely encode block motion from the region of interest and coarsely encode block motion in regions outside the region of interest.

Figure 2:
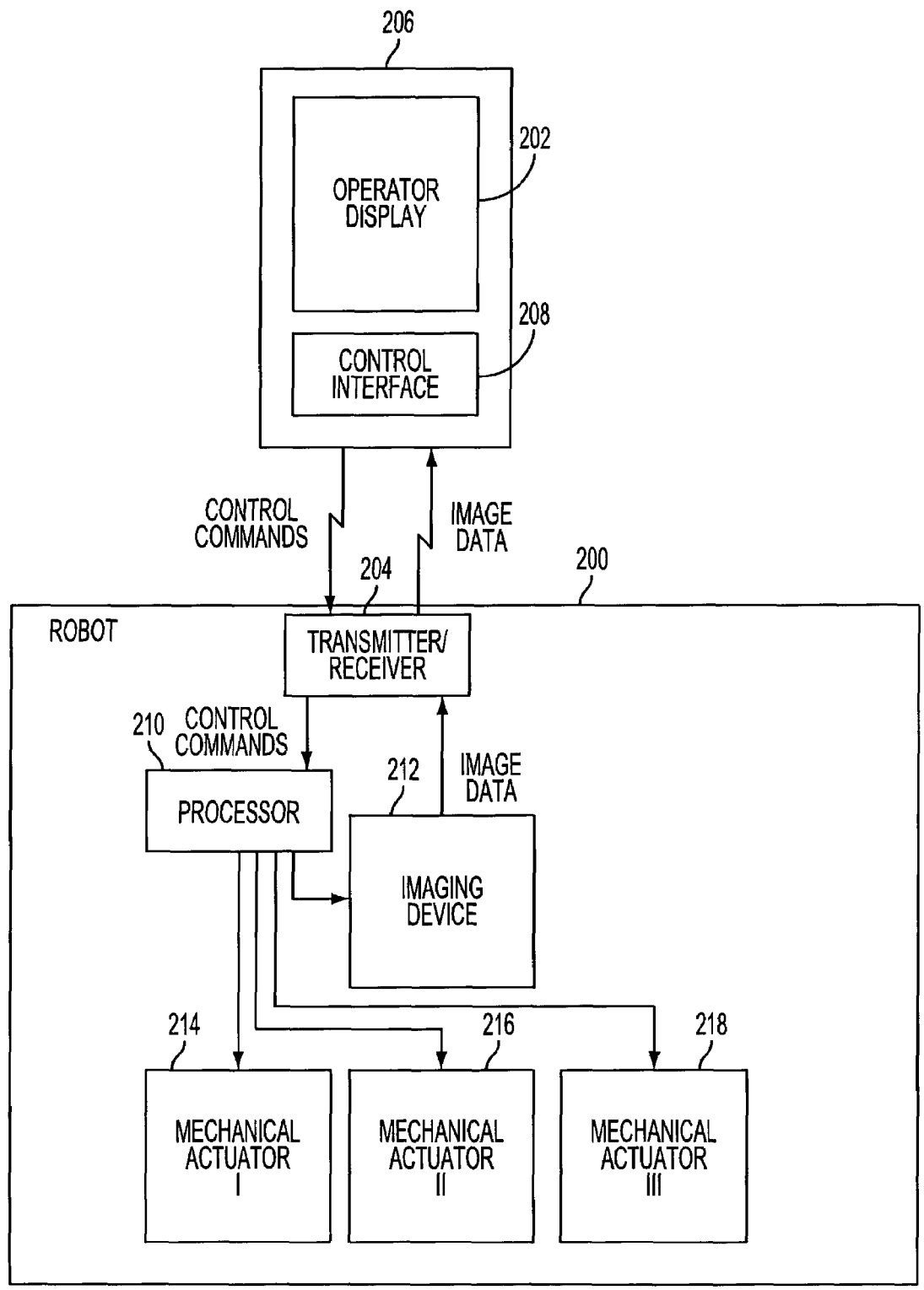
FIG. 2 is a block diagram illustrating an exemplary system of the present invention in which control commands are produced by an operator who views an operator display.

The image data can be transmitted to an operator console 206. In the example of FIG. 2, the image data is transferred to an operator display 202, which can be any suitable display including, but not limited to, any available computer monitor. The operator display 202 can be used to show images derived from the image data provided by the robot 200. In the example of FIG. 2, a transmitter/receiver 204 on the robot 200 sends the image data to operator console 206 which produces an image on the operator display 202.

In an exemplary embodiment, control commands can be produced by an operator who views the operator display. In the example of FIG. 2, the operator console 206 can include a control interface 208 which allows an operator to create control commands which are transmitted to the robot 200. The control commands can be sent to a processor 210, configured as any suitable processor or computing device, that does command processing to produce instructions to the imaging devices 212 and actuators 214, 216 and 218.

In an exemplary embodiment, the operator console 206 can be a dedicated device. The operator console 206 can include a web browser which receives image data across the Internet and provides for the production of control commands which are eventually transmitted to the robot 200 to control the robot's operations.

In the FIG. 2 example, image data can be transmitted between operator console 206 and robot 200 using a wired, or wireless connection. In an exemplary embodiment, the maximum bandwidth of the transmitted image data can be restricted. Tradeoffs in the image data characteristics can be used to keep the image data within this restricted bandwidth when one of the image data characteristics is improved.

Figure 3:
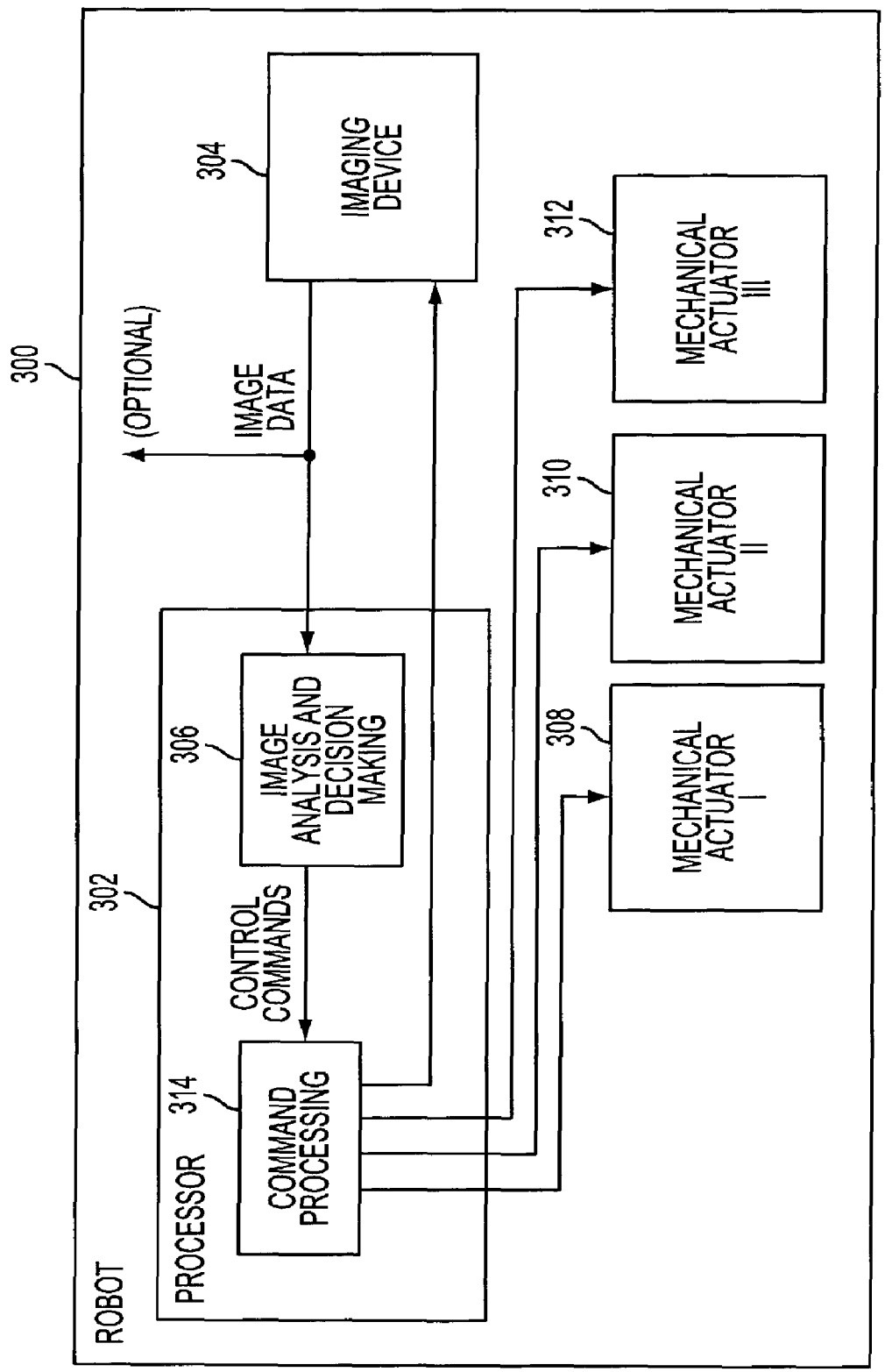
FIG. 3 is a block diagram that illustrates an exemplary embodiment of the present invention in which control commands are produced by a processor which receives the image data.

In an exemplary embodiment, the on-board robot processor can alternately, or in addition, produce the control command in response to the image data acquired. In the FIG. 3 example, robot 300 includes a processor 302 that receives image data from an imaging device 304. The processor 302 can perform image analysis and decision making based on the image data in a processor block 306 representing, for example, software and/or hardware. From the decisions, control commands are produced. A control command results in the operation of one of the actuators 308, 310 or 312 and, in accordance with an exemplary embodiment of the present invention, can modify characteristics of the image data produced by the imaging device 304. In the example of FIG. 3, the processor 302 can also perform command processing in command processing block 314 which can be separate from, or included with, processor block 306. The command processing block 314 can use the control commands of processor block 306 to produce commands, or instructions, to the imaging device and at least one actuator 308, 310 or 312. For example, image data used to guide the robot can be analyzed in block 306 to steer the robot toward a desired target object, and the imaging device can be controlled in response to the selected actuator commands (e.g., when the robot has moved to a location within reach of a given target object, resolution of the target object can be enhanced in response to a command to the robot's actuator arm).

In an exemplary embodiment, a processor which performs the image analysis and decision making can be located remote from the robot 300. A separate processor can be used for command processing, or control commands can be sent directly to the imaging device and the actuators from the remote location.

Figure 4:
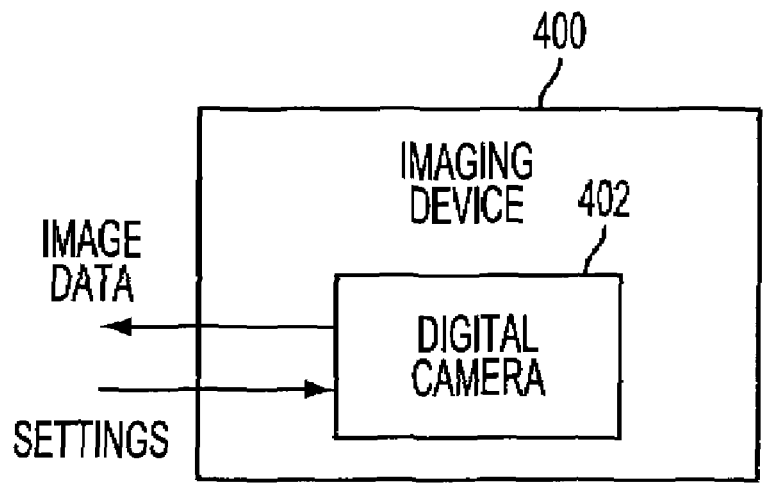
FIG. 4 is a diagram of an exemplary imaging device of the present invention which includes a digital camera.

In the exemplary embodiment of FIG. 4, the imaging device 400 comprises a digital camera 402. The settings (e.g., resolution, zoom control and so forth) of the digital camera can be changed in response to the control command. The digital camera can include software and/or hardware which can be configured to modify characteristics of the image data in a manner as described herein.

Figure 5:
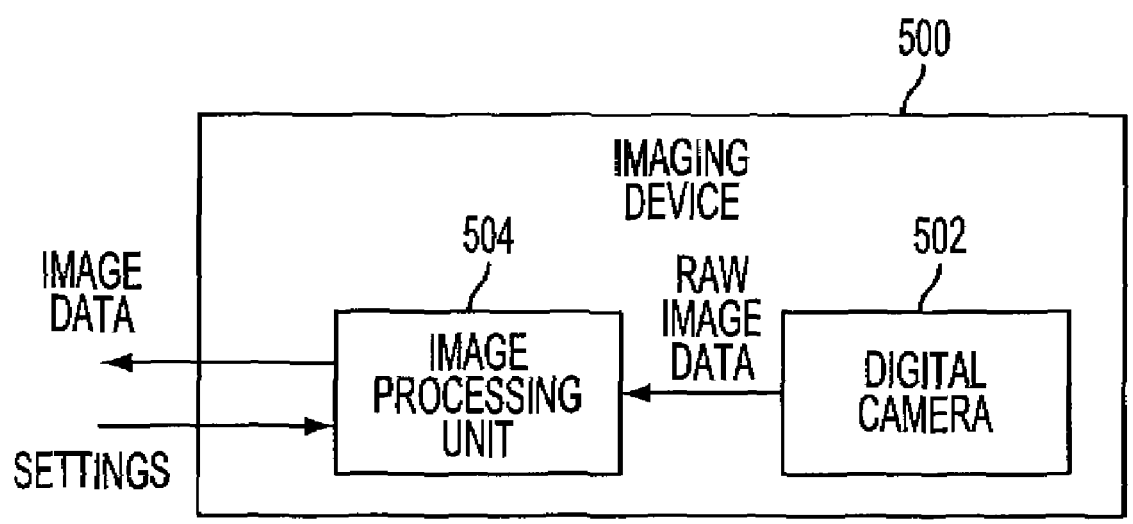
FIG. 5 is a block diagram of an exemplary imaging device which comprises a digital camera and an image processing unit.

In an exemplary embodiment, the imaging device comprises a digital camera and an optional image processing unit. In FIG. 5, the imaging device 500 includes a digital camera 502, which provides raw image data to an image processing unit 504. The operation of the image processing unit can be modified in response to a control command. In FIG. 5, the image processing unit 504 produces the image based on settings or other instructions in response to the control commands in a manner as described herein. The image processing unit can be a dedicated or shared processor. Alternately, an Integrated Circuit (IC) such as an Application Specific Integrated Circuit (ASIC) is used to implement the image processing unit.

Figure 6:
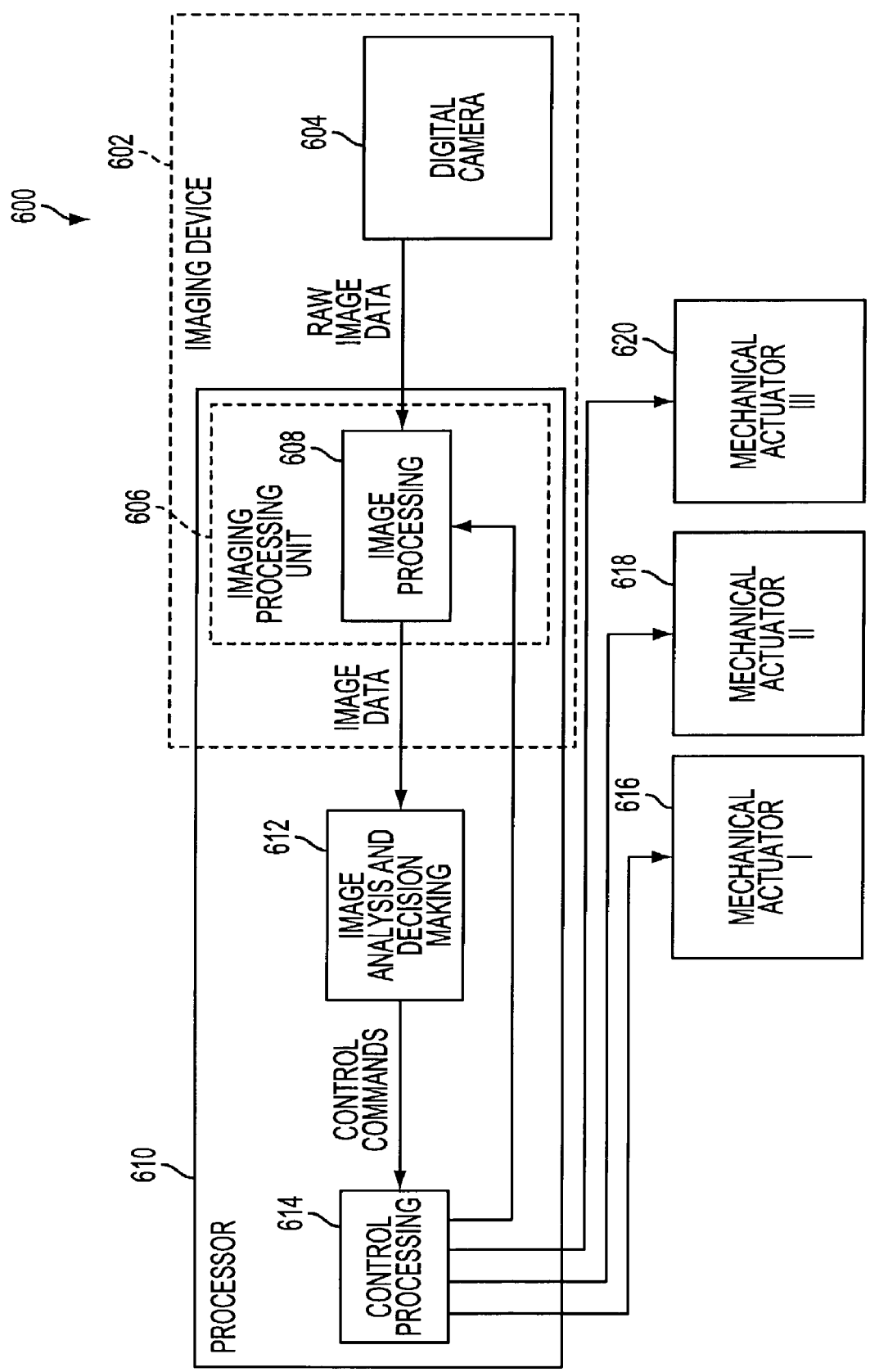
FIG. 6 is a diagram of an exemplary image processing unit of the imaging device, implemented in a processor.

In FIG. 6, robot 600 includes an imaging device 602 comprising a digital camera 604 and an image processing unit 606. In this example, the image processing unit comprises an image processing block 608 of software implemented in the processor 610. The image processing unit 608 produces the image data which is used by image analysis and decision making block 612 which can be included as software and/or hardware within the processor 610. The image analysis and decision making block 612 produces a control command which can be used in a software and/or hardware control (i.e., command) processing block 614 to produce instructions based upon the control command. In the example of FIG. 6, instructions are sent to the actuators 616, 618 or 620 and to the image processing unit 608. In the example of FIG. 6, the production of image data from the raw image data; the production of the control commands from the image data; and the production of the instructions from the control commands can be implemented in software on the processor 610.

Figure 7:
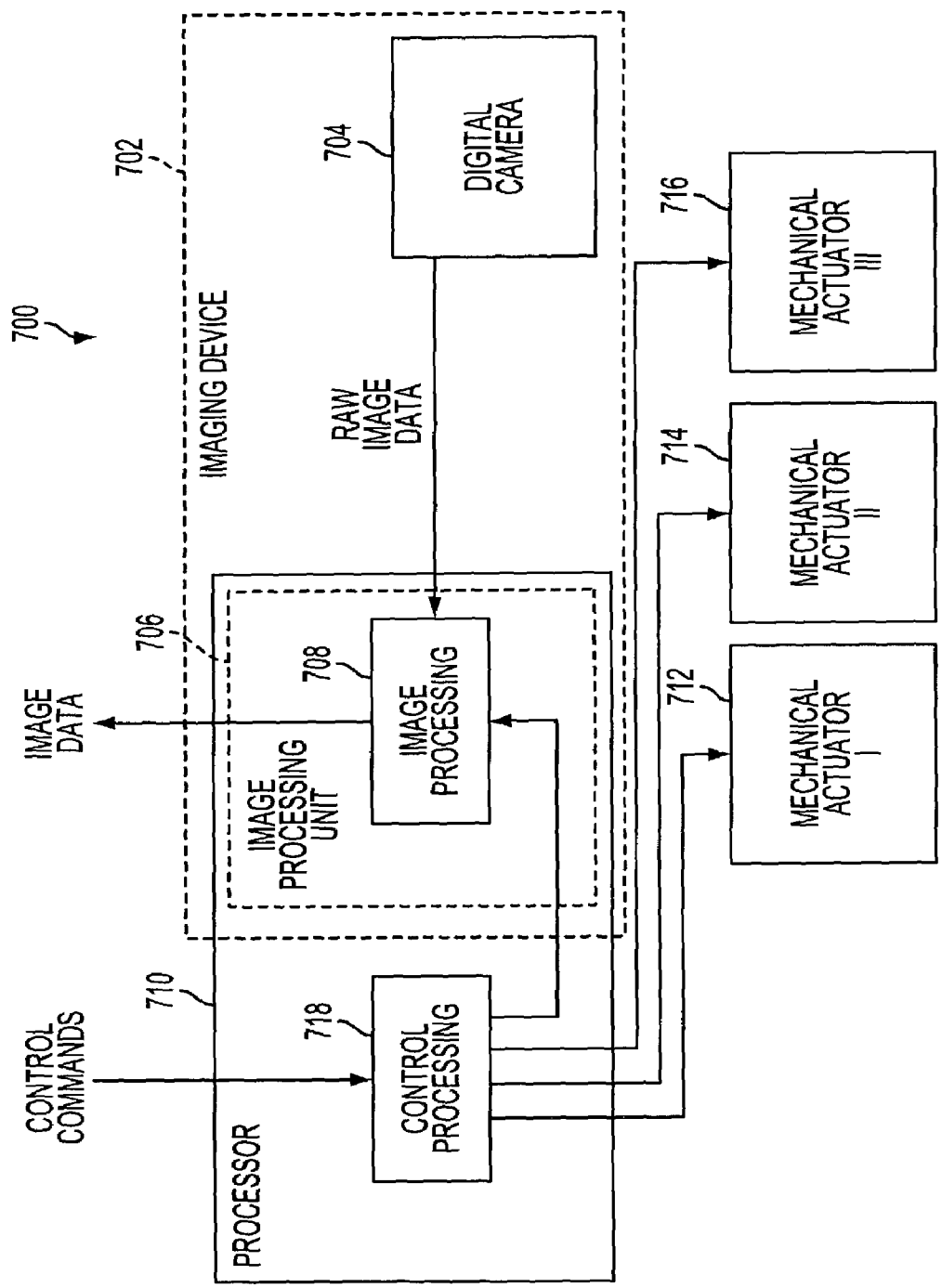
FIG. 7 is an exemplary embodiment of a robot of the present invention.

FIG. 7 illustrates of a robot 700 of an exemplary embodiment of the present invention. In the example of FIG. 7, the imaging device 702 includes a digital camera 704 and an image processing unit 706. The image processing unit 706 is an image processing block 708 implemented in software in the processor 710. The raw image data is processed in the image processing block 708 to produce image data which is transmitted from the robot 700. Control commands are sent to the robot 700 and are received by the processor 710. The control commands are received by a control processing block 718 which produce instructions to the image processing block 708 of the processor 710 and one of the actuators 712, 714 or 716.

It will be appreciated by those of ordinary skill in the art that the invention can be implemented in other specific forms without departing from the spirit or character thereof. The presently disclosed embodiments are therefore considered in all respects to be illustrative and not restrictive. The scope of the invention is illustrated by the appended claims rather than the foregoing description, and all changes that come within the meaning and range of equivalents thereof are intended to be embraced herein.

What is claimed is:

1. A robot having an imaging capability, comprising:
   an imaging device; and
   at least one actuator separate from the imaging device for moving at least a portion of the robot, the at least one actuator being controllable in response to a control command, the imaging device being responsive to the control command to modify characteristics of image data produced,
   wherein the image data includes a region of interest such that a position of the region of interest is adjusted in response to the control command; and
   wherein the imaging device is configured to blend pairs of video frames of the image data along a trajectory determined by movement of the imaging device in response to the control command.

2. The robot of claim 1, wherein the resolution of the image data is modified in response to the control command.

3. The robot of claim 1, wherein the image quality of the image data is modified in response to the control command.

4. The robot of claim 1, wherein the actuator moves the entire robot in response to the control command.

5. The robot of claim 4, wherein a frame rate of the imaging device is increased in response to the control command.

6. The robot of claim 4, wherein resolution of the imaging device is decreased in response to the control command.

7. The robot of claim 1, wherein luminance gain of the imaging device is modified in response to the control command.

8. The robot of claim 1, wherein a resolution of the image data associated with a region outside the region of interest is reduced in response to the control command and a resolution of the image data associated with the region of interest is increased in response to the control command.

9. The robot of claim 1, wherein an image quality of the image data associated with region of interest is altered in response to the control command.

10. The robot of claim 1, wherein data compression processing is modified in response to the control command.

11. The robot of claim 1, wherein the image data is transmitted to an operator display.

12. The robot of claim 1, wherein a processor produces the control command in response to the image data.

13. The robot of claim 1, wherein the imaging device comprises a digital camera, with settings changed in response to the control command.

14. The robot of claim 1, wherein the imaging device comprises a digital camera and an image processing unit, wherein operation of the image processing unit is modified in response to the control command.

15. The robot at claim 1, wherein the frame rate of the image data is modified in response to the control command.

16. A robot having an imaging capability, comprising:
an imaging means for producing image data; and
actuator means for moving at least a portion of the robot, the actuator means being controllable in response to an actuator control command, the imaging means being responsive to the actuator control command to automatically modify the imaging means for altering characteristics of the image data,
wherein the image data includes a region of interest such that a position of the region of interest is adjusted in response to the actuator control command; and
wherein the imaging device is configured to blend pairs of video frames of the image data along a trajectory determined by movement of the imaging device in response to the actuator control command.

17. The robot of claim 16, wherein resolution of the image data is modified in response to the control command.

18. The robot of claim 16, wherein image quality of the image data is modified in response to the control command.

19. The robot of claim 16, wherein a frame rate of the image data is modified in response to the control command.

20. A method for controlling a robot having an imaging capability, comprising:
receiving image data from an imaging device located on the robot;
moving at least a portion of the robot in response to an actuator control command, the imaging device being responsive to the actuator control command to automatically modify characteristics of the image data; and
blending pairs of video frames of the image data along a trajectory determined by movement of the imaging device in response to the actuator control command,
wherein the image data includes a region of interest such that a position of the region of interest is adjusted in response to the actuator control command.

* * * * *

UNITED STATES PATENT AND TRADEMARK OFFICE
CERTIFICATE OF CORRECTION

PATENT NO. : 7,310,439 B2
APPLICATION NO. : 10/206330
DATED : December 18, 2007
INVENTOR(S) : D. Amnon Silverstein It is certified that error appears in the above-identified patent and that said Letters Patent is hereby corrected as shown below:

In column 7, line 36, in Claim 15, after "robot" delete "at" and insert -- of --, therefor.

Signed and Sealed this

Twenty-second Day of July, 2008

JON W. DUDAS
*Director of the United States Patent and Trademark Office*